US012686296B2

(12) United States Patent
Marangone et al.

(10) Patent No.: US 12,686,296 B2
(45) Date of Patent: Jul. 21, 2026

(54) SYSTEM AND METHODS FOR ELECTRIC VEHICLE BATTERY CAPACITY DETERMINATION AND MANAGEMENT

(71) Applicant: Tesla, Inc., Austin, TX (US)

(72) Inventors: Frederic Marangone, Louisville, CO (US); Nicolas Altenburger, Los Altos, CA (US); Christopher Satkoski, San Jose, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/708,736

(22) PCT Filed: Dec. 1, 2022

(86) PCT No.: PCT/US2022/051553
§ 371 (c)(1),
(2) Date: May 9, 2024

(87) PCT Pub. No.: WO2023/102129
PCT Pub. Date: Jun. 8, 2023

(65) Prior Publication Data
US 2025/0010760 A1      Jan. 9, 2025

Related U.S. Application Data

(60) Provisional application No. 63/264,926, filed on Dec. 3, 2021.

(51) Int. Cl.
B60L 58/13 (2019.01)
B60L 58/16 (2019.01)

(52) U.S. Cl.
CPC .............. B60L 58/13 (2019.02); B60L 58/16 (2019.02)

(58) Field of Classification Search
None
See application file for complete search history.

(56) References Cited

U.S. PATENT DOCUMENTS

2008/0094031 A1* 4/2008 Singh ................ H01M 10/0525
320/132
2012/0256594 A1* 10/2012 Bisbing ................. B60W 10/08
180/65.21

(Continued)

FOREIGN PATENT DOCUMENTS

CN          110861533          3/2020

OTHER PUBLICATIONS

International Search Report and Written Opinion dated Apr. 5, 2023 in application No. PCT/US2022/051553.

*Primary Examiner* — James J Lee
*Assistant Examiner* — Melanie G Huber
(74) *Attorney, Agent, or Firm* — Knobbe, Martens, Olson & Bear, LLP

(57) ABSTRACT

The present disclosure generally relates to systems and methods for managing a battery of an electric vehicle. In some embodiments, a system initiates battery discharging on a battery pack, where the battery discharging continues until the battery pack reaches a first threshold level of charge. The system then estimates a first state of charge of the battery pack based at least on a first sensor reading associated with the battery pack. The system initiates battery charging on the battery pack, where the battery charging continues until the battery pack reaches a second threshold level of charge. The system estimates a second state of charge of the battery pack based at least on a second sensor reading associated with the battery pack. The system generates a processing result that indicates a capacity of the battery pack based at least on the first state of charge and the second state of charge.

19 Claims, 7 Drawing Sheets

(56) References Cited

U.S. PATENT DOCUMENTS

| | | | |
|---|---|---|---|
| 2013/0015814 A1* | 1/2013 | Kelty | B60L 3/0046 |
| | | | 320/109 |
| 2015/0066406 A1* | 3/2015 | Sun | G01R 31/392 |
| | | | 702/63 |
| 2016/0149420 A1* | 5/2016 | Sasaki | B60L 50/64 |
| | | | 320/134 |
| 2016/0370433 A1* | 12/2016 | Chazal | G01R 31/396 |
| 2018/0313906 A1 | 11/2018 | Takahashi et al. | |
| 2019/0113581 A1* | 4/2019 | Kawamura | B60L 58/12 |
| 2019/0308630 A1* | 10/2019 | K | B60W 10/06 |
| 2020/0254899 A1 | 8/2020 | Uchida et al. | |

* cited by examiner

BATTERY
102

BATTERY
PACK
104

BATTERY
CELL
106

BATTERY
MANAGEMENT
SYSTEM 108

WHEEL
110

100

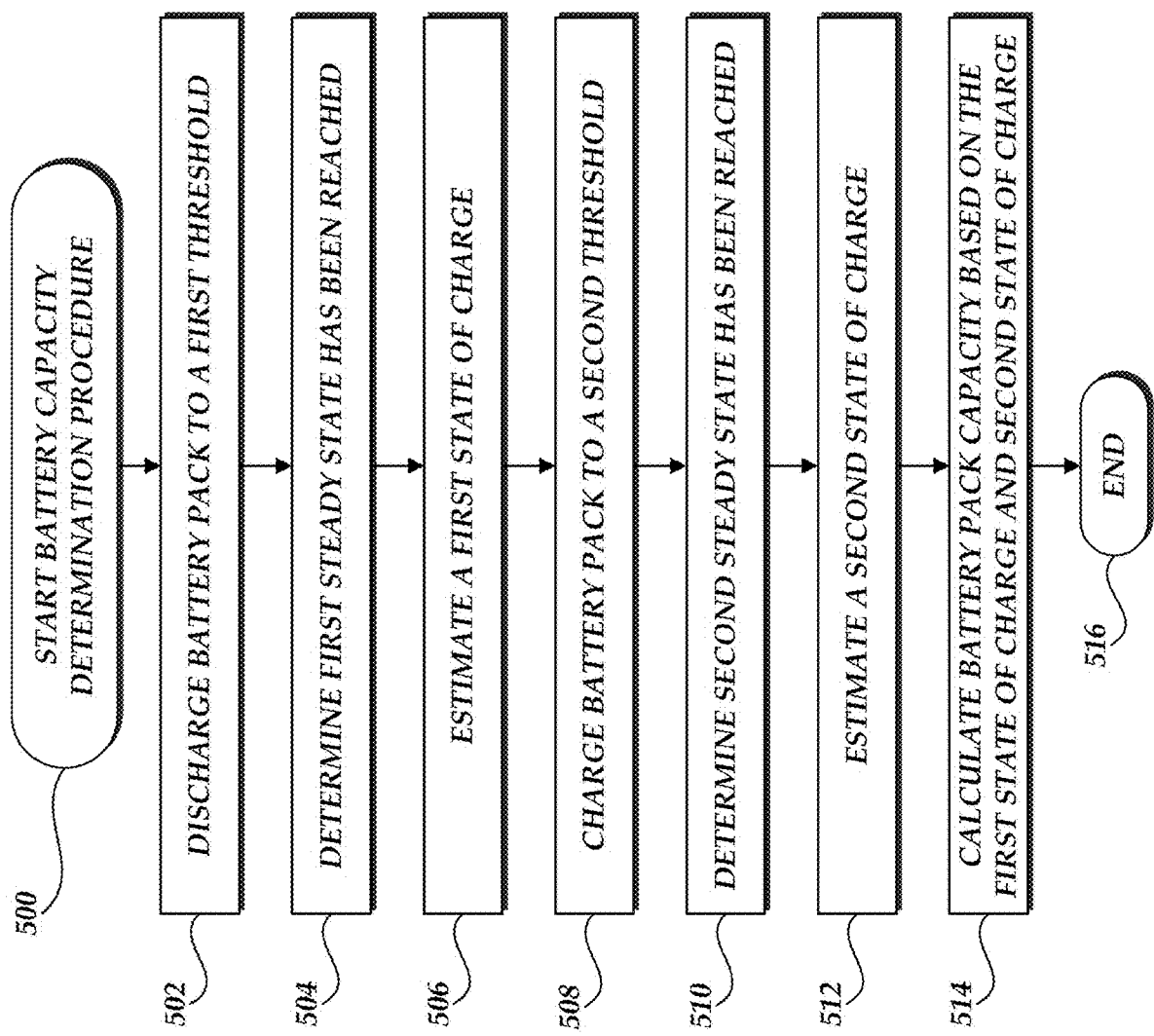

START BATTERY CAPACITY DETERMINATION PROCEDURE

500

DISCHARGE BATTERY PACK TO A FIRST THRESHOLD

502

DETERMINE FIRST STEADY STATE HAS BEEN REACHED

504

ESTIMATE A FIRST STATE OF CHARGE

506

CHARGE BATTERY PACK TO A SECOND THRESHOLD

508

DETERMINE SECOND STEADY STATE HAS BEEN REACHED

510

ESTIMATE A SECOND STATE OF CHARGE

512

CALCULATE BATTERY PACK CAPACITY BASED ON THE FIRST STATE OF CHARGE AND SECOND STATE OF CHARGE

514

END

SYSTEM AND METHODS FOR ELECTRIC VEHICLE BATTERY CAPACITY DETERMINATION AND MANAGEMENT

CROSS-REFERENCE TO RELATED APPLICATION

This application is a non-provisional of and claims priority to U.S. Provisional Patent Application No. 63/264,926, entitled "VEHICLE RESOURCE CAPACITY MANAGEMENT," filed on Dec. 3, 2021, which is hereby incorporated by reference in its entirety and for all purposes.

BACKGROUND

Generally described, a variety of vehicles, such as electric vehicles, hybrid vehicles, etc., can require some connection to an external power source to at least partially recharge internal power sources, such as a battery pack. In certain scenarios, the state of health or other characterization of operability of electric vehicle resources, such as the battery pack, can assist in the operation and maintenance of vehicles.

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a service provider. In another embodiment, the user computing device can collect or generate information and provide the collected information to a server computing device for further processing or analysis.

BRIEF DESCRIPTION OF THE DRAWINGS

Generally described, a variety of vehicles, such as electric vehicles, hybrid vehicles, etc., can require some connection to an external power source to at least partially recharge internal power sources, such as a battery pack. In certain scenarios, the state of health or other characterization of operability of electric vehicle resources, such as the battery pack, can assist in the operation and maintenance of vehicles.

FIG. 5 depicts an illustrative routine for determining battery capacity through charging and discharging a battery pack in accordance with aspects of the present disclosure.

DETAILED DESCRIPTION

Figure 1:
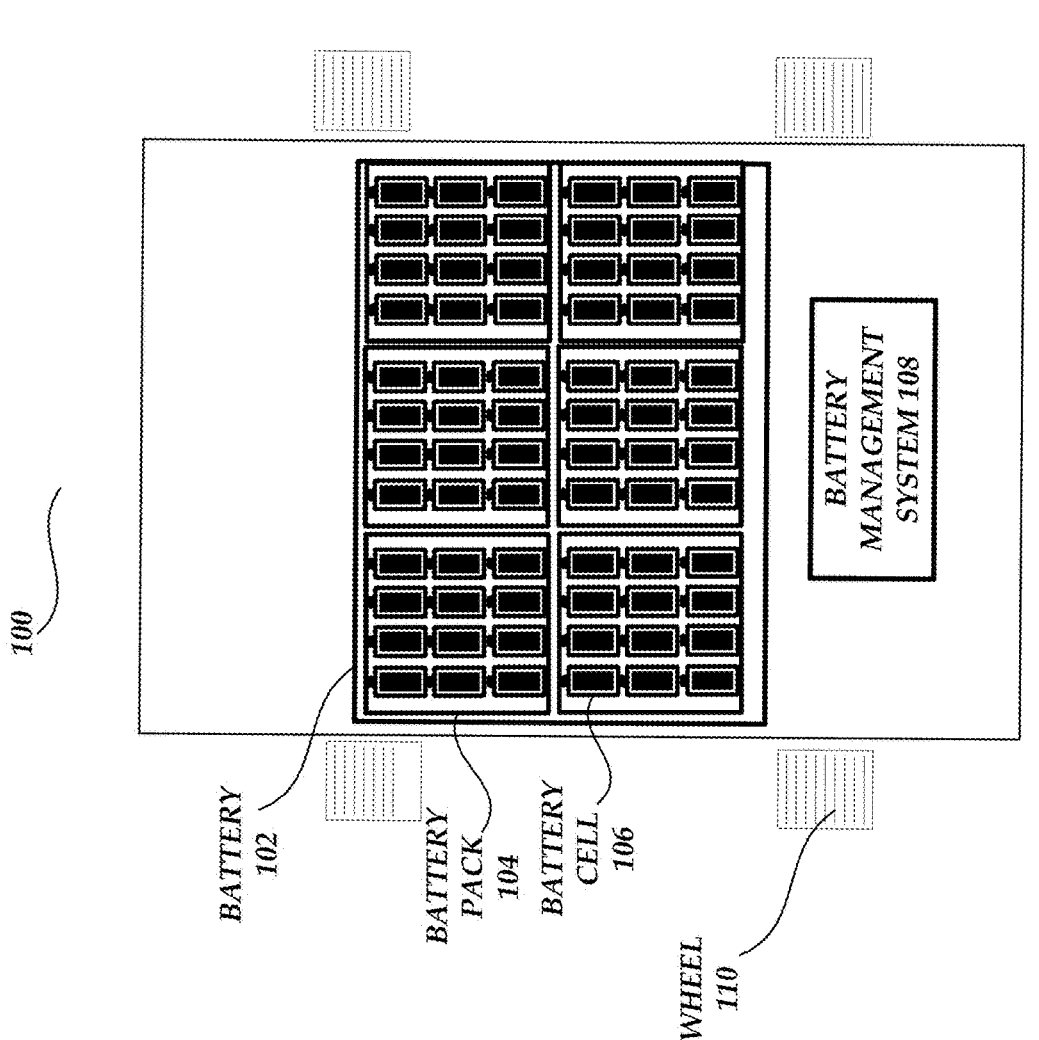
FIG. 1 depicts an example electric vehicle including a battery management system in which embodiments of the present disclosure can be implemented.

Generally described, one or more aspects of the present disclosure relate to the configuration and management of actions associated with the management of a device, such as an electric vehicle. By way of an illustrative example, aspects of the present application relate to the characterization of an operational status of the battery pack or associated components based on management of processes associated with the delivery of energy from one or more available power sources. Illustratively, the characterization of an operational status can correspond to measurement of battery pack capacity indicators and estimation of battery pack capacity metrics based on implementation of a capacity determination methodology, which can include cycling through a complete charging or discharging process. Additionally, aspects of the present application can further include comparison of the estimated battery pack capacity metrics with one or more nominal battery pack metrics. Additionally, responsive or mitigation actions can be initiated.

Illustratively, the capacity determination methodology can include processes, such as charging processes, that can be defined in terms of a minimum defined amount of time, based on environmental conditions, to achieve one or more defined charging parameters/goals. The charging parameters/goals can correspond to providing sufficient energy to the vehicle battery pack to achieve a threshold amount of charge (e.g., a partial charge or full charge) and retain the achieved state of charge in the battery pack. As will be explained in greater detail, the capacity determination methodology can illustratively begin by reducing any previously retained charge state to a minimum threshold level, such as by activating power consuming resources (e.g., heater and compressor) in the vehicle. The resulting state of charge can be identified as a first state of charge metric. Thereafter, the battery pack is charged to achieve an established maximum or desired threshold level, which may represent a desired charging state or complete charge. The resulting state of charge can be identified as a second state of charge metric. A battery capacity management system can then utilize the two state of charge metrics to estimate a current battery pack capacity.

Generally described, a characterization of a state of health of components of a vehicle, such as the battery pack, are difficult to accurately determine or estimate. In one example, characterizations of range of available travel distance is often associated with a characterization of a state of health or operational status of a battery pack. However, the estimation of vehicle range generally corresponds to complex and time-consuming processes that attempt to estimate the total amount of work that can be delivered by the battery pack (and associated components), which is dependent on the discharge and charge conditions experienced during operation of the battery pack/vehicle (e.g., how many components consume energy during operation). These processes typically include inputs from other components, such as devices/components generating a load on the electrical system, hardware and software components that manage power distribution and consumption and the like. Accordingly, the accuracy of vehicle range as an approximation of a state of health of the battery pack has clear deficiencies and often leads to errors.

Electric vehicles typically include some form of Battery Management System (BMS) that, among other functions, attempts to estimate the remaining capacity of the battery pack. For example, a BMS may receive inputs from various sensors to monitor battery pack operational parameters such as voltage, current and temperature. The resulting measurements can be utilized to generate range estimates that are provided to the user, such as via interfaces on the vehicle. However, the accuracy of traditional range estimate processes is weak and based on the cycling patterns of the battery and the characteristics of its cells, an accurate estimation based on these measurements cannot always be guaranteed. Still further, consumers may incorrectly assume that a drop in estimated vehicle range at a threshold amount of charge (e.g., designated full charge state or maximum charge) for the battery pack, or a drop in estimated vehicle maximum range, such as estimated distances displayed in a vehicle user interface (UI), can correspond to issues with the electric vehicle's battery pack. This can lead to unnecessary or inappropriate requests for repairs, warranty claims or poor consumer experiences.

In other examples, characterizations of energy retention in the battery pack and associated components can be associated with the state of health or operational state of a battery pack. However, the estimation of energy retention in the battery pack and associated components typically requires external equipment for measurement. Usually, accurate estimation of energy retention in the battery pack is performed in laboratory environment, which is less accessible to the consumers. For example, in a laboratory environment, a battery pack may need to be removed from the vehicle or otherwise require modifications to the vehicle to facilitate testing. Additionally, the resulting characterizations of energy retention are not easily recognizable to consumers and can lead to unnecessary or inappropriate requests for repairs, warranty claims or poor consumer experiences.

To address at least a portion of the above deficiencies, aspects of the present application correspond to utilization of a specified capacity determination methodology to obtain a set of metrics associated with the battery pack and associated components. The resulting metrics can be further processed to characterize battery pack capacity. The results of the determined battery pack capacity are then provided to inform the user of a battery pack state of health (or operational status), which is illustratively represented as a percentage of the current determined battery pack capacity as compared to a nominal battery pack capacity value. The determined battery pack capacity can be further stored and used by management components, such as a BMS, to perform calibration or other responsive actions that can improve range estimation accuracy or initiate corrective functions/services when appropriate.

Illustratively, the battery pack capacity determination process can be initiated by the user via a command or control, such as via inputs provided through an interface. Based on the initiated command, the vehicle, such as through the BMS, will automatically perform one or more capacity determination methodologies, which can include a sequence of events to discharge and then charge the battery pack. Alternatively, the sequence of events can be to charge and then discharge the battery pack. In one aspect, the specific process utilized by a vehicle or the adjustable parameters of a specific discharge/charge process can vary according to components of the vehicle, vendors, manufacturers, government agencies, or other third parties (e.g., insurance companies). Illustratively, the discharge/charge process utilizes on-board vehicle loads, such as HVAC systems, to achieve different states of charge for the battery pack. In another aspect, a user may utilize an application program developed by a network service provider to remotely trigger the battery capacity determination process. As such, the battery pack capacity determination process can be more easily performed by a user or another party at a parking lot, home environment or elsewhere.

During the sequence of events, a capacity determination application automatically captures, stores and processes data to finally report an evaluation of the battery pack remaining capacity. The results of the characterization of battery pack capacity are reported to the user, such as via a user interface. Additionally, the processing results, such as the underlying metrics or characterizations may be used to re-calibrate parameters in the BMS, elicit additional diagnostics or repair, generate alerts, and the like.

Although the various aspects will be described in accordance with illustrative embodiments and combination of features, one skilled in the relevant art will appreciate that the examples and combination of features are illustrative in nature and should not be construed as limiting. More specifically, aspects of the present application may be applicable with various types of vehicle charging mechanisms, power sources, interfaces and the like. Still further, although a specific capacity determination methodology for discharging and charging electric vehicle battery packs ("capacity determination methodology") will be described, such illustrative capacity determination methodologies should not be construed as limiting. Accordingly, one skilled in the relevant art will appreciate that the aspects of the present application are not necessarily limited to application to any particular type of vehicle, vehicle charging infrastructure, data communications or illustrative interaction between vehicles, owners/users, and a network service provider.

FIG. 1 depicts an example electric vehicle 100 in which embodiments of the present disclosure can be implemented. As shown in FIG. 1, the electric vehicle 100 has a battery 102, a battery management system 108 and a plurality of wheels 110. In some embodiments, the battery 102 can include a plurality of battery pack 104, and each battery pack 104 can include a plurality of battery cells 106. The configuration of battery pack 104 and battery cell 106 can be determined based on specific applications. The battery management system 108 can be configured to monitor the states of the battery 102. For example, the battery management system 108 can monitor state of charge, voltage, current, temperature, operating time, impedance or the like for each battery pack 104.

In some embodiments, the battery 102 can be connected to a battery discharging load (not shown in FIG. 1) to drain battery power from the battery 102. Illustratively, the battery discharging load can be a heater, compressor, or other components of the electric vehicle 100 that drain electric power In these embodiments, the battery management system 108 can initiate battery discharging processes on the battery 102 to discharge power from the battery 102 to the battery discharging load During the battery discharging process, the battery management system 108 can measure the current, voltage and energy of each battery pack 104 and transmit measurement results to a user interface (not shown in FIG. 1) in real time. In some examples, the user interface may be a display panel installed in the electric vehicle 100 or a mobile device that is remotely connected to the battery management system 108 through a wireless communication channel. In other embodiments, the battery discharging load can be external component(s) to the electric vehicle, such as external power draining circuitry/device. In still other embodiments, the battery discharging load can be a bi-directional power equipment that is capable of providing power to the battery 102 and draining power from the battery 102.

Figure 2A:
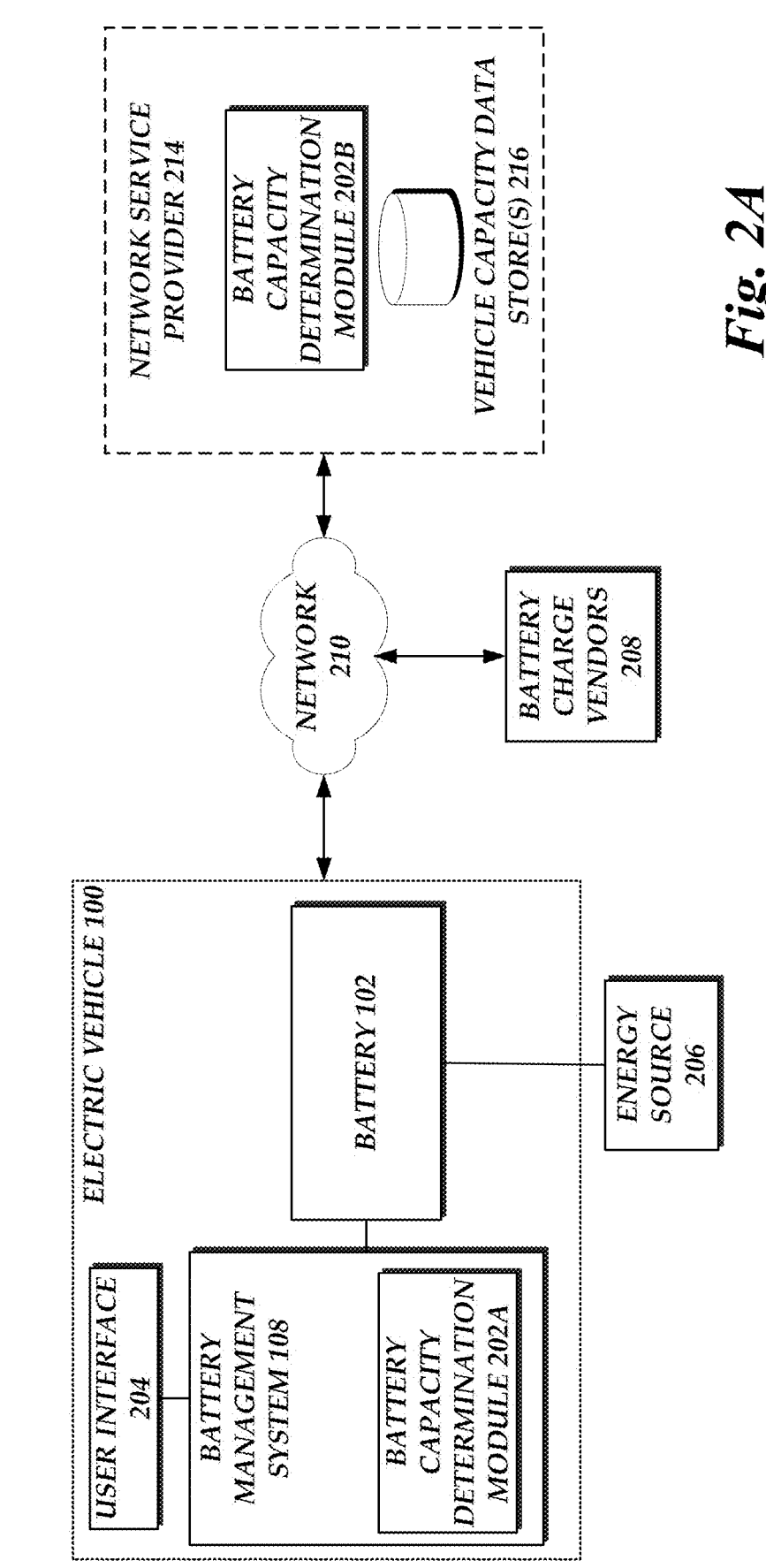
FIG. 2A depicts an environment in which a battery of the electric vehicle of FIG. 1 can be managed in accordance with one or more aspects of the present application.

FIG. 2A illustrates a battery management environment 200 in which a battery 102 of an electric vehicle 100 can be charged and discharged in accordance with one or more aspects of the present application. The battery management environment 200 includes a collection of local resources that may be utilized to provide electric charging functionality to electric devices, such as the electric vehicle 100. The collection of local resources may include one or more vehicles that include connections for receiving electric charge from an external energy source 206. The electric vehicle 100 may be associated with, or provide access to, a user interface 204 for obtaining user inputs or displaying information related to the conditions of the battery 102. The user interface 204 may be generated on interface equipment provided within the electric vehicle 100 or via external computing devices accessed by a user of the vehicle, such as mobile devices, laptop computing devices, kiosks and the like. In other words, the user interface 204 may be physically within the electric vehicle 100 or may be remotely connected to the electric vehicle 100 through wireless communication channels or computer networks.

The local resources can further include charging infrastructure equipment (e.g., charging components) that physically couple to the electric vehicle 100 to provide energy to the battery 102. The charging components may be able to access power from at least one power source, such as electric current provided by a third-party service provider. In some embodiments, the charging components can include a plurality of power sources that may be selectable individually or used in combination to provide energy to the electric vehicle 100.

As shown in FIG. 2A, the local resources further include a battery capacity determination module 202A within the battery management system 108 of the electric vehicle 100. The battery capacity determination module 202A, which will be described in greater detail later, can be a combination of hardware and software that are configured to determine a capacity of the battery 102 or a capacity of a battery pack of the battery 102. Illustratively, the battery capacity determination module 202A is a part of the battery management system 108 hosted on the electric vehicle 100. Alternatively, the battery capacity determination module 202A may be hosted on charging components, mobile devices or other components of the electric vehicle 100. The battery capacity determination module 202A can obtain or maintain preference information regarding desired capacity determination procedures. In some embodiments, the desired capacity determination procedure is provided by the battery charge vendors 208 through the network 210. In other embodiments, the desired capacity determination procedure is previously stored in the vehicle capacity data store(s) 216 of the network service provider 214. The battery capacity determination module 202A can further measure charging performance metrics for vehicle components, such as the battery 102 of the electric vehicle 100 and associated components. The battery capacity determination module 202A still further can determine battery pack state of health or operational status characterizations in the form of battery pack capacity. The battery capacity determination module 202A can facilitate the generation of notifications, alerts or mitigation actions.

The local resources are represented in a simplified, logical form and do not reflect all of the physical software and hardware components that may be implemented to provide the functionality associated with the local resources.

As shown in FIG. 2A, the battery management environment 200 further includes a network service provider 214 that can communicate with one or more of the local resources via computer network connections provided by the network 210. As such, the network service provider 214 may manage the battery of the electric vehicle 100 remotely. In some embodiments, the network service provider 214 can implement the battery capacity determination module 202B that functions similarly to the battery capacity determination module 202A hosted on the electric vehicle 100. In other embodiments, the network service provider 214 can implement the battery capacity determination module 202B to coordinate with the battery capacity determination module 202A of the local resources for determining a capacity of a battery pack of the battery 102. As such, the battery capacity determination module 202B and the battery capacity determination module 202A may each perform a portion of steps required to manage the battery 102. For example, the battery capacity determination module 202B may choose a particular procedure to be utilized for determining the capacity of the battery 102 and transmit the particular procedure to the battery capacity determination module 202A for implementation. The network 210 may be any wired network, wireless network, or combination thereof. In addition, the network 210 may be a personal area network, local area network, wide area network, cable network, fiber network, satellite network, cellular telephone network, data network, or combination thereof. In the example environment of FIG. 2A, the network 210 is a global area network (GAN), such as the Internet. Protocols and components for communicating via the other aforementioned types of communication networks are well known to those skilled in the art of computer communications and thus, need not be described in more detail herein. The network service provider 214 is represented in a simplified, logical form and does not reflect all of the physical software and hardware components that may be implemented to provide the functionality associated with the network-based service(s).

Figure 2B:
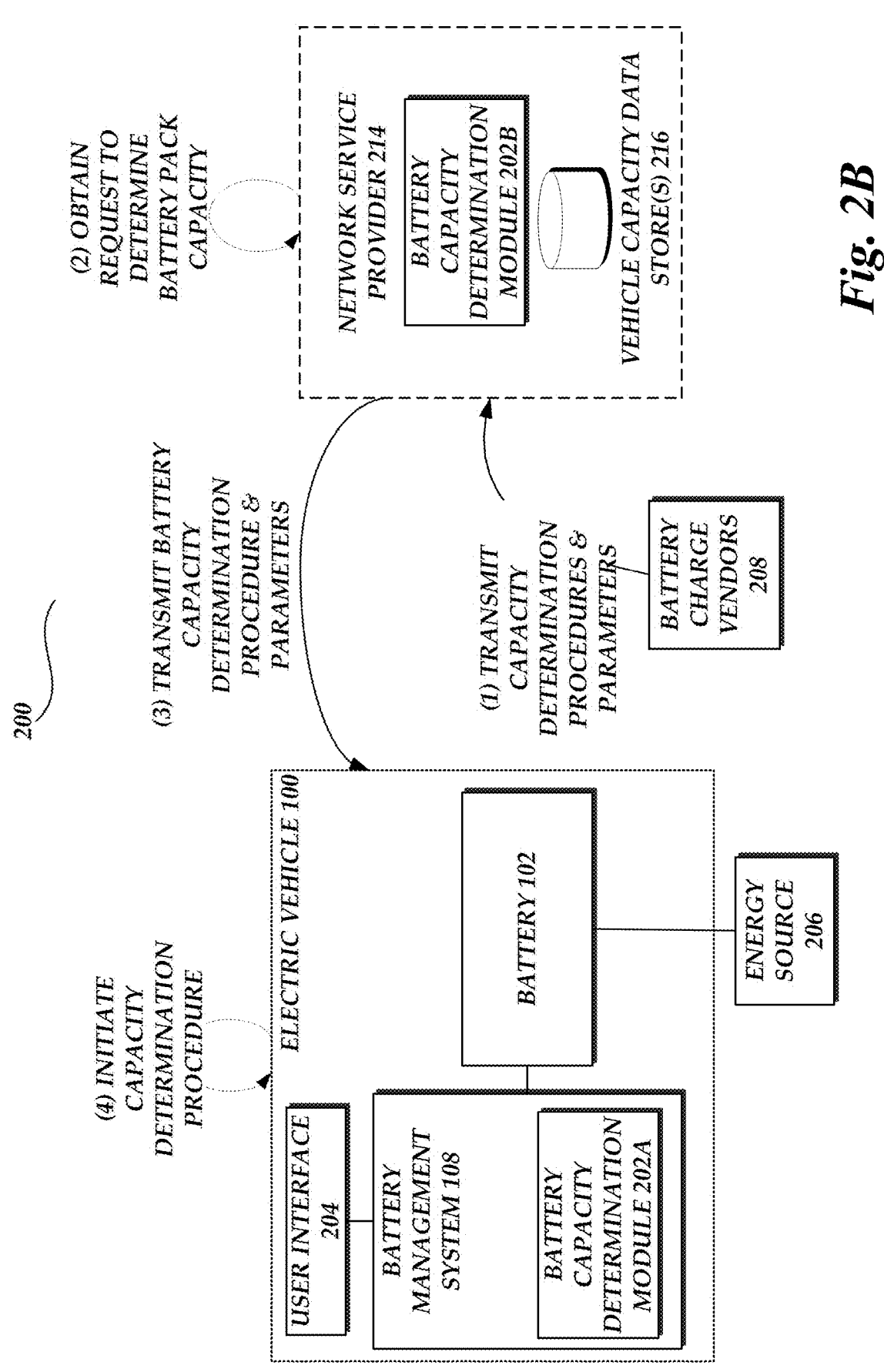
FIG. 2B depicts illustrative interactions between components of the environment of FIG. 2A to initiate a battery management process that includes determining a capacity of a battery of an electric vehicle.

FIG. 2B depicts illustrative interactions between components of the environment of FIG. 2A to initiate a battery management process for determining a capacity of a battery pack of the electric vehicle 100. The interactions of FIG. 2B begin at (1), where the battery charge vendors 208 transmit battery capacity determination procedures and parameters to the network service provider 214. The transmission can be a spontaneous action on the part of the battery charge vendors 208 or be triggered pursuant to a request from the network service provider 214. Depending on the types or models of the battery pack and the electric vehicle involved, the battery capacity determination procedure and parameters can be customized and adjusted by the battery charge vendors 208 or the network service provider 214. In some embodiments, the battery capacity determination procedure and parameters can be stored in the vehicle capacity data store(s) 216 hosted by the network service provider 214. In other embodiments, the battery capacity determination procedure and parameters can be stored in the battery capacity determination module 202B hosted by the service provider 214.

Thereafter, at (2), the network service provider 214 obtains a request to determine capacity of a battery pack installed on the electric vehicle 100. In some embodiments, the request may be generated when certain conditions are met. For example, the network service provider 214 may record the date when the capacity of the battery pack is last determined and triggers the request to determine the capacity when that date is above a certain number. Alternatively, the request may be manually input by a user through a user interface of a user device, such as a mobile device (not shown in FIG. 2B). In some embodiments, the network service provider 214 may provide an application program that can be installed on a mobile device of the user. The application program may be a part of the battery capacity determination module 202B hosted by the network service provider 214. The application program can present a user interface that receives request to determine capacity of a battery pack from the user. The application program can prompt the user to optionally enter information about the electric vehicle 100 (e.g., the vehicle model or the mileage of the vehicle) so that the network service provider 214 can determine the particular battery capacity determination procedure and parameters to be implemented by the battery capacity determination module 202B. Advantageously, through the application program or other interfaces provided by the network service provider 214, the user can more easily and actively initiate a battery capacity determination procedure on different kinds of batteries hosted by different kinds of electric vehicles.

In some embodiments, the battery charge vendors 208 may transmit several sets of battery capacity determination procedures and parameters and the network service provider 214 can choose one set of procedures and/or parameters that are to be implemented by the battery capacity determination modules 202B and/or 202A. For example, the network service provider 214 may choose a particular battery capacity determination procedure and associated parameters tailored for the electric vehicle 100 and battery 102. As another example, the battery capacity determination procedure and parameters may be customized when the same battery pack is installed on two different types (e.g. sedan and truck) of electric vehicles such that the battery pack capacity can be more accurately or efficiently determined. In such an example, the battery charge vendor 208 may provide a different procedure and different parameters based on the types of associated electric vehicles and the network service provider 214 may choose the one procedure that has been shown to yield accurate capacity determination results for the electric vehicle 100 and the battery 102. Advantageously, the capacity of the battery 102 may be more accurately determined.

At (3), in response to obtaining the request to determine capacity of a battery pack, the network service provider 214 transmits the battery capacity determination procedure and parameters for implementing the battery capacity determination procedure to the electric vehicle 100. As described above, the network service provider 214 may choose the suitable battery capacity determination procedure along with associated parameters based on information about the electric vehicle 100 and the battery 102. The electric vehicle 100 may store the procedure and the parameters in the battery management system 108 or, more specifically, in the battery capacity determination module 202A for later implementation.

In response to receiving the parameters from the network service provider 214, at (4), the electric vehicle 100 initiates the battery capacity determination procedure on a battery pack installed on the electric vehicle 100. More specifically, the battery capacity determination module 202A executes the battery capacity determination procedure, which may include a sequence of steps such as charging and discharging the battery pack. A detailed description about the battery capacity determination procedure will be described with respect to FIG. 5. During execution of the battery capacity determination procedure, the battery capacity determination module 202A may collect different battery capacity metrics associated with the battery pack on which the battery capacity determination procedure is performed. Based on the collected capacity metrics, the battery capacity determination module 202A may generate results related to the battery pack capacity such as the remaining capacity of the battery pack.

Figure 2C:
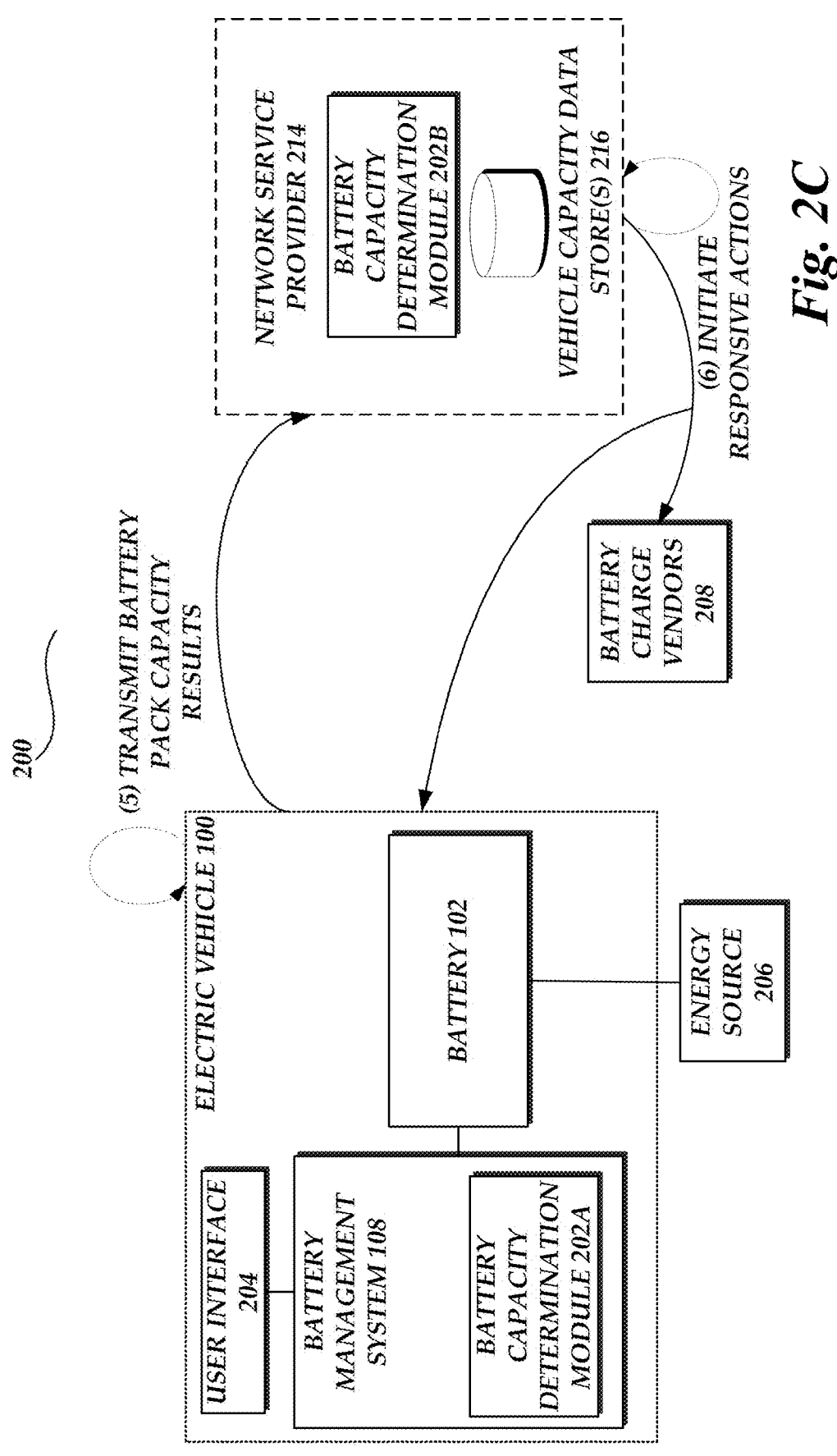
FIG. 2C depicts illustrative interactions between components of the environment of FIG. 2A to manage a battery of an electric vehicle based on determined battery capacity in accordance with some embodiments of the present disclosure.

With reference now to FIG. 2C, at (5), the battery capacity determination module 202A may transmit the battery pack capacity results back to the network service provider 214. The network service provider 214 may store the results in the battery capacity determination module 202B or the vehicle capacity data store(s) 216 for further analysis. In some embodiments, the network service provider 214 may then present the battery pack capacity results through an application program to a user interface of a mobile device to notify a user or a third-party that is concerned with the capacity of the battery pack. Alternatively, the battery pack capacity results can be transmitted to the user interface 204 of the electric vehicle 100 to alert a driver of the electric vehicle 100.

At (6), the battery capacity determination module 202B may initiate responsive actions depending on the battery pack capacity results. In some embodiments, the responsive actions may be sending alerts to prompt the battery charge vendors 208 to repair or replace the battery 102. To avoid unnecessary repair, for example, the battery capacity determination module 202B may set an appropriate range of capacity within which the repair or replace alert will not be triggered. In other embodiments, the battery capacity determination module 202B may select a new battery capacity determination procedure and implement the newly selected procedure on the battery 102 to determine again the capacity of a battery pack. Alternatively, the battery capacity determination module 202B may generate certificate for the battery 102, certifying that the remaining capacity of the battery 102 is above a certain value.

Figure 3:
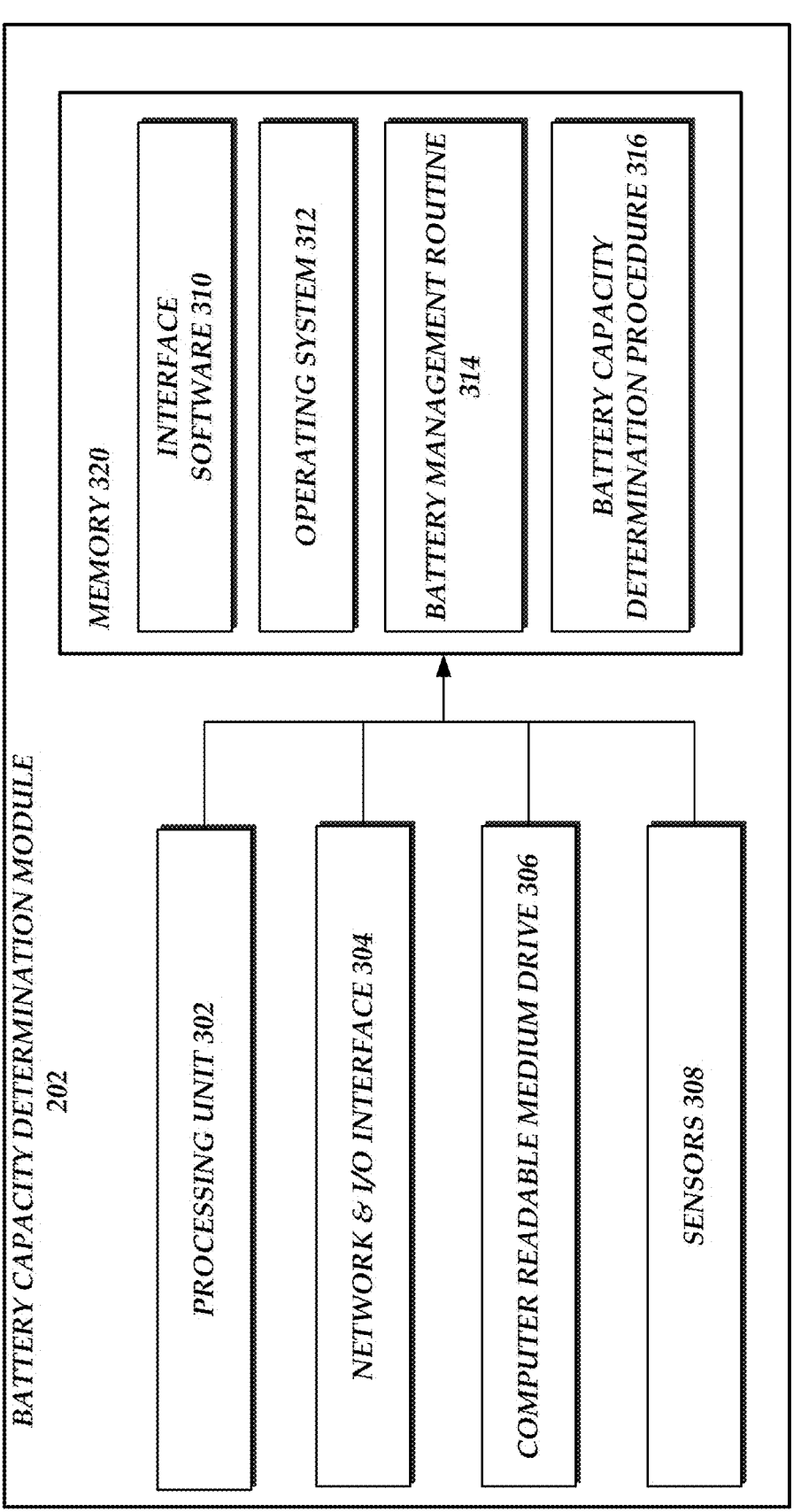
FIG. 3 depicts a general architecture of a battery capacity determination module for managing a battery of an electric vehicle in accordance with aspects of the present disclosure.

With reference now to FIG. 3, an illustrative architecture for implementing the battery capacity determination module 202 on one or more local resources or a network service provider will be described. The battery capacity determination module 202A and/or 202B described in FIGS. 2A-2C may adopt the same or similar architecture as described in FIG. 3. The battery capacity determination module 202 may be part of components/systems that provide other functionality associated with a battery pack of the battery 102, associated component or the general electrical system of the electric vehicle 100. For example, the battery capacity determination module 202 can be embodied as part of the BMS 108 of the electric vehicle 100. In other embodiments, the battery capacity determination module 202 may be a stand-alone application that interacts with other components of an electric vehicle, such as a BMS, controllers, management systems, etc.

The architecture of FIG. 3 is illustrative in nature and should not be construed as requiring any specific hardware or software configuration for the battery capacity determination module 202. The general architecture of the battery capacity determination module 202 depicted in FIG. 3 includes an arrangement of computer hardware and software components that may be used to implement aspects of the present disclosure. As illustrated, the battery capacity determination module 202 includes a processing unit 302, a network and I/O (input/output) interface 304, a computer readable medium drive 306, and one or more sensors 308, all of which may communicate with one another by way of a communication bus (not explicitly shown in FIG. 3). The components of the battery capacity determination module 202 may be physical hardware components or implemented in a virtualized environment.

The network and I/O interface 304 may provide connectivity to one or more networks or computing systems, such as the network 210 of FIG. 2A. The processing unit 302 may thus receive information and instructions from other computing systems or services via the network 210. The processing unit 302 may also communicate to and from memory 320 and further provide output information for an optional display via the network and I/O interface 304. In some embodiments, the battery capacity determination module 202 may include more (or fewer) components than those shown in FIG. 3, such as implementations found in a mobile device or an electric vehicle.

The memory 320 may include computer program instructions that the processing unit 302 executes in order to implement one or more embodiments in accordance with the present disclosure. The memory 320 generally includes RAM, ROM, or other persistent or non-transitory memory. The memory 320 may store an operating system 312 that provides computer program instructions for use by the processing unit 302 in the general administration and operation of the battery capacity determination module 202. The memory 320 may further include the interface software 310 for transmitting and receiving computer program instructions and other information for implementing aspects of the present disclosure. For example, in one embodiment, the memory 320 stores a battery management routine 314 that is configured to initiate a defined battery capacity determination procedure 316 and cause the implementation of the battery capacity determination procedure 316 as described herein. In some embodiments, the battery management routine 314 determines or calculates battery pack capacity based on processed battery pack metrics observed/measured during implementation of the battery capacity determination procedure 316. In some embodiments, the battery capacity determination module 202 can maintain a plurality of data stores utilized in accordance with one or more aspects of the present application, including charging preferences for charging parameters, including desired charge, battery pack preconditioning and other vehicle attributes, performance metrics for individual power sources, and other information.

Figure 4:
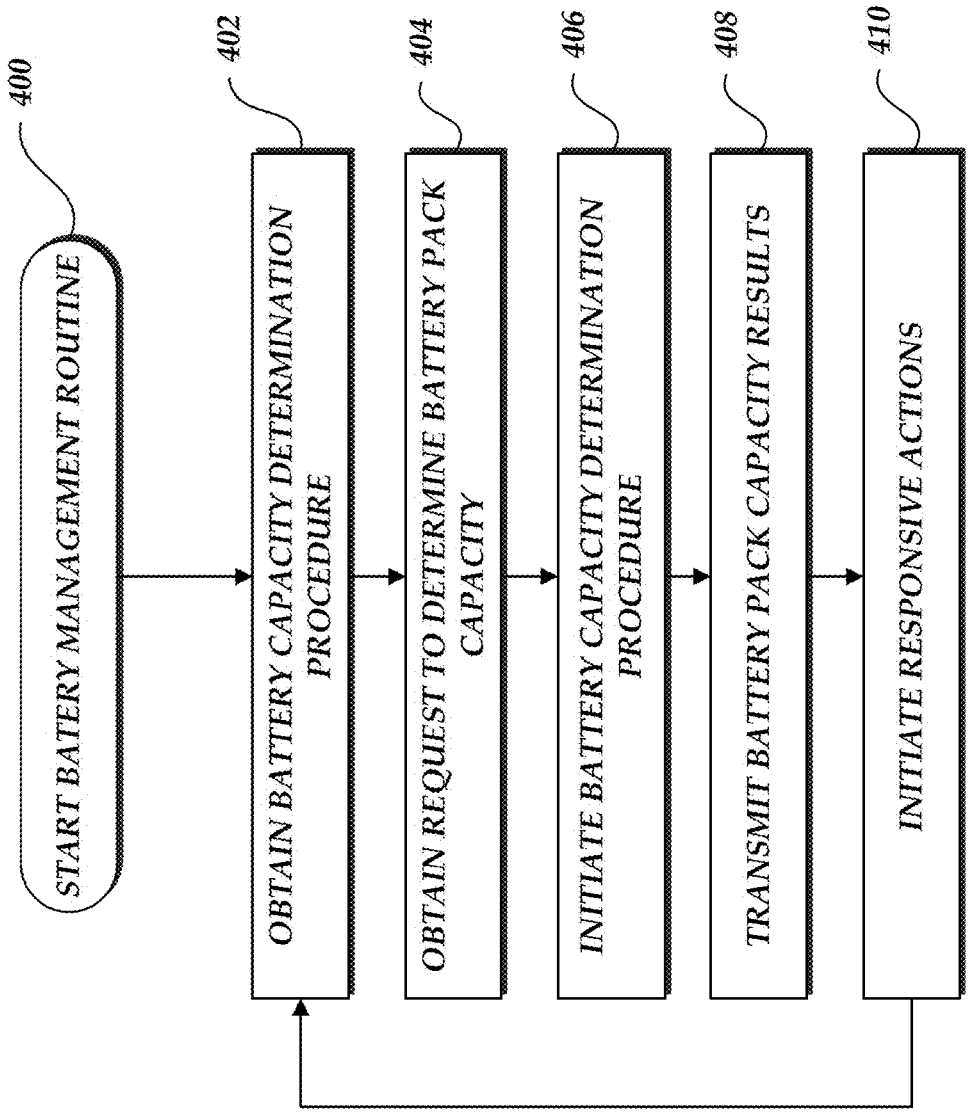
FIG. 4 depicts an illustrative routine for managing a battery of an electric vehicle through the coordination of a battery capacity determination procedure and responsive actions based on determined battery capacity.

Turning now to FIG. 4, an illustrative flow diagram of a battery management routine 400 for managing a battery of an electric vehicle, such as a battery pack of the battery 102 of the electric vehicle 100, will be described. The battery management routine 400 may be implemented, for example, by the battery capacity determination module 202A and/or 202B of FIG. 2A or the battery capacity determination module 202 of FIG. 3.

The battery management routine 400 begins at block 402, where the battery capacity determination module 202 may obtain a battery pack capacity determination procedure corresponding to a specified capacity determination methodology. Illustratively, the battery pack determination procedure corresponds to a set of actions implemented by the electric vehicle 100 and the battery capacity determination module 202. As described herein, the set of actions includes operation of the vehicle discharging components and charging components to cause a discharge of the battery pack to a defined state of charge and a charge of the battery pack to another defined state of charge. The specific operation of vehicle components to achieve a charge or discharge and the specific values of the defined states of charge can vary according to battery pack configuration, vehicle, vendor, manufacturer, user, governmental agencies, or other third-parties. Accordingly, the battery capacity determination module 202 can be configured or updated with one or more battery pack determination procedures as applicable. Advantageously, a user may utilize the battery capacity determination module 202 to more accurately determine capacity of a battery pack installed on different types of electric vehicles under different operating conditions (e.g. battery temperature or environment humidity). The battery pack determination procedure can be pre-loaded or transmitted via a physical or wireless connections to the vehicle, mobile applications or charging components.

At block 404, the battery capacity determination module 202 obtains a request to determine battery pack capacity by receipt of a command or control, such as via inputs provided through an interface. In one example, a user may be presented with one or more user interfaces that are generated on the vehicle displays, such as the user interface 204 hosted on the electric vehicle 100. In another example, a user may access a user interface via a computing device for making the request to determine battery pack capacity of a battery pack of the battery 102 of the electric vehicle 100, such as a mobile computing device that is remote to the electric vehicle 100. In still another example, the user may utilize an application program associated with the network service provider 214 to make the request to determine battery pack capacity through the network service provider 214. In other examples, the receipt of the command can correspond to the evaluation of trigger criteria, such as time-based criteria, event-based criteria, operational parameter-based criteria, and the like. As such, the request to determine battery pack capacity may be made automatically in that the user does not need to manually trigger the determination. In still other examples, the receipt of the command can correspond to diagnostic or repair processes that can request the initiation of the battery management routine 400 or incorporate the battery management routine 400 as part of such functionality.

Based on the request to determine a battery pack capacity, at block 406, a battery capacity determination procedure is initiated. For example, the electric vehicle 100, such as through the battery capacity determination module 202 or other components of the BMS 108, will perform and adjust a sequence of events to discharge and then charge a battery pack, such as a battery pack of the battery 102 of the electric vehicle 100. Illustratively, the discharge/charge process utilizes on-board vehicle loads, such as HVAC systems, to achieve different states of charge for the battery pack. Alternatively, the battery capacity determination procedure utilizes external components such as a bi-directional electric power equipment that can discharge and charge a battery pack. Other external components such as power draining circuitry or device can also be used to discharge power from a battery pack in the electric vehicle 100. Also, power grids at parking lots or other power source at home can be utilized by the battery capacity determination procedure to charge the battery pack. In other example, the electric vehicle 100 can enter into a waste energy mode that allows a battery pack of the electric vehicle to be discharged at a higher rate than discharging the battery pack using other techniques described above. An illustrative process for the battery capacity determination procedure will be described in greater detail later with reference to FIG. 5.

During the sequence of events, the battery capacity determination module 202 may automatically capture, store, display and process data. More specifically, at block 408, the battery capacity determination module 202 can process a set of battery pack capacity metrics to provide an evaluation of the battery pack remaining capacity and transmit the results to other components associated with an electric vehicle, such as the user interface 204 of the electric vehicle 100 illustrate in FIG. 2A. One illustrative battery pack metric can correspond to a state of the battery pack after it has been discharged below a minimum state of charge threshold ("min charge metric"). Another illustrative battery pack metric can correspond to another state of the battery pack ("max charge metric") after it has been charged at a maximum state of charge threshold. Yet another illustrative battery pack metric can correspond to aggregate of net Amp-hour movement of the battery pack during a charging cycle. Illustratively, the measurements of the various battery pack metrics can further take into account steady state values of the battery pack, such as utilization of confidence bounds and additional processes to ensure that battery pack attributes are stable for the measured battery pack metric.

Advantageously, during the sequence of events, the user interface 204 may display a message showing that the battery management routine 400 is in progress to discourage interruptions from users or other operations that might adversely affect the progression of the battery management routine 400. Optionally, the battery capacity determination module 202 can further decline to perform certain operations on the vehicle that might impact the accuracy of battery pack capacity determination while the battery management routine 400 is running.

The battery capacity determination module 202 can then characterize or calculate a state of health for the battery pack as a function of the battery pack metrics described above. Illustratively, the capacity of the battery pack can be characterized as a quotient of the aggregate net Amp-hour movement over the net difference between the max charge metric and the min charge metric. Additionally, the battery capacity determination module 202 can then further calculate the battery pack capacity as a percentage of a nominal value. Illustratively, the nominal values can correspond to initially (e.g. while the battery 102 was "fresh" or just manufactured by a battery vendor) measured values for the particular battery pack, average or normalized values, or manually adjusted values.

After generating the results regarding the remaining battery pack capacity, the results of the characterization of battery pack capacity can be reported to the user, such as via a user interface 204. In one example, the user may be presented with actual capacity values or the determined percentage. In another example, the user may be presented with indicators (e.g., icons, color bars, sounds, etc.) that provide some further information regarding interpretation/evaluation of the determined battery pack capacity. For example, an icon may be displayed indicating that the determined percentage of battery pack capacity is within the service level agreements provided by a manufacturer. For another example, a warning icon or sound may be played to alert a user when the determined capacity is below a particular threshold (e.g. 95% or 90%). Additionally, the particular threshold can be programmable or customized by a user. In other examples, the results of the characterization of battery pack capacity are transmitted to a device remote (e.g. a mobile device of a user or vehicle maintenance provider) to the vehicle. As such, more interactive or proactive battery capacity check can be facilitated.

At block 410, the processing results, such as the underlying metrics or characterizations, may be used to initiate responsive actions based on the determined capacity of the battery pack. The responsive actions may include re-calibrating parameters in the BMS, eliciting additional diagnostics or repair, generating alerts, and the like. In another example, the electric vehicle 100 may generate service screens that may elicit a repair request or warranty claim. In still another example, the electric vehicle 100 or other components in the battery management environment 200 can provide functionality to generate certificates of completion and values, such as for purposes of insurance claims, resales, lease returns, etc. Still further, the battery capacity determination module 202 can cause the storage on the metric data or determined capacity values in local or remote storage, such as the vehicle capacity data store(s) 216. Illustratively, the battery management routine 400 can return to block 402 to obtain another battery capacity determination procedure and repeat for subsequent trigger events. Alternatively, the battery management routine 400 can end at block 408 when no responsive actions are needed or end at block 410 when no further responsive actions are needed.

Turning now to FIG. 5, an illustrative routine 500 for determining a battery pack capacity in accordance with illustrative embodiments will be described. The routine 500 may be implemented, for example, by the battery capacity determination module 202A and/or 202B of FIG. 2A or the battery capacity determination module 202 of FIG. 3. As described above, a battery capacity determination procedure can illustratively include operations of the vehicle components and charging components to cause a discharge of the battery pack to a defined state of charge and a charge of the battery pack to another defined state of charge. Additionally, the battery capacity determination procedure can include the further operation of additional components of the vehicle or charging components as part of discharging the battery pack, charging the battery pack, or a combination thereof.

At block 502, the battery capacity determination module 202 discharges a battery pack, such as a battery pack of the battery 102 of the electric vehicle 100, until the battery pack reaches a first threshold level of charge Illustratively, the battery capacity determination module can utilize one or more components of the electric vehicle 100 that are configured to consume energy from the battery pack. Such systems, components or mode of operations include, but are not limited to, HVAC systems (e.g., a heater), compressors, "waste energy" mode, external plugs, and the like. As an example, the component can be an energy sink that drains energy from the battery pack within a desired amount of time. As another example, the components can be a bi-directional power supply. In other words, the component is capable of supplying power to the battery pack and draining power from the battery pack as an electronic load. A vehicle or power grid at parking lots or residential spaces can also serve to consume energy from the battery pack during the execution of the capacity determination procedure. Different components or systems can be used for discharging the battery pack depending on the desired goal. For example, when the goal is to discharge the battery pack quickly, the battery capacity determination module 202 may trigger the electric vehicle 100 to enter into the "waste energy" mode rather than turning on the heater to expedite the discharging process. The battery capacity determination module 202 can further change operational parameters of these components in accordance with specific processes/configurations to control the rate of discharge or manage the operation of the additional components in accordance with specified procedures. The battery capacity determination module 202 will continue to discharge the battery pack until the determined charge is below the first threshold level of charge.

Preferably, the threshold may be tunable based on the desired accuracy and duration of the capacity determination procedure. In one example, the threshold associated with discharging the battery pack is tuned down to correspond with a lower voltage reading from the battery pack. As such, the accuracy of the capacity estimation can be increased as the battery pack is closer to a fully discharged state. As another example, the threshold associated with discharging the battery pack is tuned up to certain degree. As such, the entire capacity determination procedure can be completed within a shorter amount of time.

In some embodiments, the discharging continues until the battery pack reaches a threshold level of charge. For example, the threshold level of charge may be the electric current flowing out from the battery pack is below a particular value (e.g., 1 Amp). As another example, the threshold level of charge may be that the measured voltage of the battery pack is below certain value (e.g., 200 V). In other example, the threshold level of charge may be a particular combination of electrical current and remaining voltage measured from the battery pack. In another example, the threshold level of charge is a minimum state of charge (e.g., a defined lower state of charge for the battery pack) of the battery pack.

At block 504, the battery capacity determination module 202 determines the battery pack has reached a first steady state. The battery capacity determination module 202 may reduce all power consumption from the battery pack to let the battery voltage or battery chemistry of the battery pack stabilize or reach an equilibrium chemical state. Illustratively, the battery capacity determination module 202 may determine the battery pack has stabilized by counting a particular period of time (e.g., thirty seconds) after the discharging stops. Optionally, the battery capacity determination module 202 may adjust the counting period based on capacity determination parameters provided by the battery charge vendors 208. Alternatively, the battery capacity determination module 202 may determine the battery pack has stabilized when certain event occurs. For example, the battery capacity determination module 202 may determine the battery pack has stabilized when the difference between two consecutive measurements of the voltage of the battery pack is smaller than a certain value (e.g., 0.05 V).

At block 506, the battery capacity determination module 202 estimates a first state of charge of the battery pack (e.g., the min charge metric) based on sensor readings, such as sensor readings provided by the sensors 308. Illustratively, the battery capacity determination module 202 can utilize voltage readings from sensors 308. In one embodiment, the battery capacity determination module 202 can implement confidence bounds for this estimation of the state of charge metric. In this example, if the confidence of the estimation reaches a desired target (e.g., a confidence of above 95%), the battery capacity determination module 202 can record the state of charge metric. In some embodiments, an open circuit voltage measurement (i.e., measuring the voltage of the battery pack without load) may be utilized to estimate the state of charge of the battery pack. In other embodiments, voltage measured when the battery pack voltage has stabilized under load can be used to estimate the state of charge of the battery pack.

At block 508, the battery capacity determination module 202 charges the battery pack using the charging components, such as the external energy source 206, until the battery pack reaches a second threshold level of charge. The battery capacity determination module 202 can also manage the operational status of any components of the vehicle, especially in scenarios where the operational status may have been changed from the adjustment in block 504. During the battery capacity determination procedure, the battery capacity determination module 202 can collect metric information. Specifically, in one embodiment, the battery capacity determination module 202 can collect and aggregate net Amp-hour movement during the charging process. The battery capacity determination module 202 can store this information as another battery metric. In some embodiments, the battery pack may be charged by a power grid or power source at home or a parking lot. As described previously, the charging can be facilitated by the use of bi-directional power devices that are also used to discharge the battery pack at block 502.

Similar to the description at block 502, the second threshold may also be tunable depending on the applicable conditions and goals. For example, when the battery capacity determination procedure has to be completed within a shorter amount of time, the second threshold may be lowered compared with situations when time is not of essence. In some embodiments, the first threshold at block 502 and the second threshold at block 508 correspond to different voltage readings from sensors 308 and the second threshold corresponds to a higher voltage reading than the first threshold. In another example, the second threshold level of charge is a maximum state of charge (i.e. the highest possible state of charge for the battery pack) of the battery pack.

At block 510, the battery capacity determination module 202 reduces all power consumption from the battery pack to let the battery pack voltage stabilize or let the battery pack chemistry reach a second steady state. Illustratively, the battery capacity determination module 202 can be configured with timing-based or event-based criteria to identify the appropriate amount of time for voltage stabilization as described with respect to block 504. In some embodiments, the battery capacity determination module 202 determines that the battery chemistry of the battery pack has stabilized based on a confidence bound (e.g., a confidence of above 90% that the battery pack has stabilized).

At block 512, the battery capacity determination module 202 estimates another battery pack metric (e.g., the max charge metric) based on sensor readings, such as readings from the sensors 308. Illustratively, the battery capacity determination module 202 estimates a second state of charge, which will be used to calculate the capacity of the battery pack along with the first state of charge estimated at block 506. As described above, in one embodiment, the battery capacity determination module 202 can implement confidence bounds for this estimation of the state of charge metric. In this example, if the confidence of the estimation reaches a desired target, the battery capacity determination module 202 can record the state of charge metric.

At block 514, the battery capacity determination module 202 can determine or calculate battery capacity as a percentage of nominal capacity and estimated state of charge. In some embodiments, the battery capacity determination module 202 subtract the first state of charge estimated at block 506 from the second state of charge estimated at block 512 to obtain a difference metric. Then, the battery capacity determination module 202 may divide an electrical current movement amount between the first steady state determined at block 504 and the second steady state determined at block 512 to obtain the capacity of the battery pack. Illustratively, the battery capacity determination module 202 can calculate the remaining capacity of the battery using the formula: capacity=aggregate amp hour/(max charge metric−min charge metric). Additionally, the battery capacity determination module can utilize the capacity value and nominal capacity to determine percentages. As described above, the nominal values can correspond to initially measured values for the particular battery pack, average or normalized values, or manually adjusted values. For instance, the battery capacity determination module 202 may divide the capacity of the battery pack by the nominal value to derive a capacity percentage to show how much capacity still remains with the battery pack compared with another capacity measured when the battery pack is "fresh" or out of the battery manufacturer.

At block 516, the routine 500 terminates. As described above with reference to FIG. 4, processing results such as sending an alert to the user or displaying information on a user interface accessible to a user can be generated based on the estimated battery pack capacity. Depending on the applicable situations, the routine 500 may be re-initiated by the battery capacity determination module 202 in response to a request from a user or the happenstance of an automatic triggering event.

As illustrated in FIG. 5, the battery pack is discharged in block 502 before the battery pack is charged in block 510. Alternatively, the charging of the battery pack can precede the discharging in some battery charge and discharge cycles. In some embodiments, the battery capacity determination module 202 may randomly discharge the battery pack before charging the battery pack or charge the battery pack before discharging the battery pack. In other embodiments, the battery capacity determination module 202 may determine a state of charge of the battery pack before initiating the battery capacity determination procedure. As such, the battery capacity determination module 202 may utilize the determined state of charge of the battery pack to decide the order of charging and discharging the battery pack in the battery capacity determination procedure as illustrated in FIG. 5. For example, before initiating the battery capacity determination procedure as in block 406, the battery capacity determination module 202 may determine that a current state of charge of the battery is closer to a fully charged state. Then, the battery capacity determination module 202 will charge the battery pack before discharging the battery pack during the battery capacity determination procedure. Advantageously, such charge and discharge sequence can allow the battery capacity determination procedure to be performed within a shorter amount of time and also consume less electrical energy. Additionally or alternatively, in some embodiments, the routine 500 may skip block 502 where the battery pack is discharged to a first threshold. In other words, discharging the battery pack at block 502 may not be performed under certain conditions. For example, if the battery pack is already in a low enough charge state (e.g. a user drives the electric vehicle long enough so that energy left in the battery pack is below a certain threshold) when the routine 500 is triggered, block 502 can be skipped and the routine 500 can proceed to block 504 directly. Advantageously, the routine 500 may complete in a shorter amount of time when block 502 is properly skipped.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the present application. It is to be understood that the forms of disclosure herein shown and described are to be taken as representative embodiments. Equivalent elements, materials, processes, or steps may be substituted for those representatively illustrated and described herein. Moreover, certain features of the disclosure may be utilized independently of the use of other features, all as would be apparent to one skilled in the art after having the benefit of this description of the disclosure Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed:

1. A system for managing a battery of an electric vehicle, the system comprising:

one or more processors configured to execute a battery capacity determination procedure, the battery capacity determination procedure comprising:

determining a current state of charge of a battery pack before initiating battery discharging and battery charging;

initiating the battery discharging, wherein the battery discharging discharges a battery pack until a charge state associated with the battery pack reaches a first threshold level of charge;

estimating a first state of charge of the battery pack based on the charge state associated with the battery pack reaching the first threshold level of charge;

initiating the battery charging, wherein the battery charging charges the battery pack until the charge state associated with the battery pack reaches a second threshold level of charge;

estimating a second state of charge of the battery pack based on the charge state associated with the battery pack reaching the second threshold level of charge; and generating a processing result based at least on the first state of charge and the second state of charge, wherein the processing result comprises a capacity of the battery pack, wherein the battery capacity determination procedure initiates the battery charging before initiating the battery discharging based on the current state of charge of the battery pack.

2. The system of claim 1, wherein the one or more processors is further configured to determine the charge state associated with the battery pack has reached a first steady state, wherein the one or more processors estimates the first state of charge of the battery pack in response to determining the charge state associated with the battery pack has reached the first steady state.

3. The system of claim 2, wherein the one or more processors is further configured to determine the charge state associated with the battery pack has reached a second steady state, wherein the one or more processors estimates the second state of charge of the battery pack in response to determining the charge state associated with the battery pack has reached the second steady state.

4. The system of claim 1, wherein generating the processing result comprises dividing the capacity of the battery pack by a nominal value to derive a capacity percentage, wherein the nominal value is obtained from the one or more processors executing the battery capacity determination procedure when the battery pack is at an initial condition.

5. The system of claim 1, wherein the one or more processors is further configured to:

obtain the battery capacity determination procedure from a battery charge vendor; and obtain a request to determine battery pack capacity from a user, wherein the one or more processors executes the battery capacity determination procedure in response to obtaining the request to determine battery pack capacity.

6. The system of claim 1, wherein the one or more processors is further configured to transmit the processing result to a user interface associated with the electric vehicle.

7. The system of claim 1, wherein the processing result further comprises at least one of a repair alert, a warranty or a certificate associated with the battery pack.

8. The system of claim 1, wherein the first threshold level of charge corresponds to a minimum state of charge of the battery pack and the second threshold level of charge corresponds to a maximum state of charge of the battery pack.

9. The system of claim 1, wherein at least a portion of the one or more processors is located remotely to the electric vehicle.

10. The system of claim 1, wherein initiating the battery discharging comprises discharging the battery pack using at least one of a heater, a compressor or a waste energy mode of the electric vehicle.

11. The system of claim 1, wherein initiating the battery discharging comprises discharging the battery pack using a bi-directional power equipment, and wherein initiating the battery charging comprises charging the battery pack using the bi-directional power equipment.

12. A computer-implemented method comprising:

executing, by one or more processors of an electric vehicle, a battery capacity determination procedure, the battery capacity determination procedure comprising:

determining a current state of charge of a battery pack before initiating battery discharging and battery charging;

initiating the battery discharging, wherein the battery discharging discharges a battery pack until a charge state associated with the battery pack reaches a first threshold level of charge;

estimating a first state of charge of the battery pack based at least on a first sensor reading associated with the battery pack and the charge state associated with the battery pack reaching the first threshold level of charge;

initiating the battery charging, wherein the battery charging charges the battery pack until the charge state associated with the battery pack reaches a second threshold level of charge;

estimating a second state of charge of the battery pack based at least on a second sensor reading associated with the battery pack and the charge state associated with the battery pack reaching the second threshold level of charge; and generating a processing result associated with the battery pack based at least on the first state of charge and the second state of charge, wherein the battery capacity determination procedure initiates the battery charging before initiating the battery discharging based on the current state of charge of the battery pack.

13. The computer-implemented method of claim 12, further comprising:

obtaining the battery capacity determination procedure from a battery charge vendor; and obtaining a request to determine battery pack capacity from a user, wherein the one or more processors executes the battery capacity determination procedure in response to obtaining the request to determine battery pack capacity.

14. The computer-implemented method of claim 12, further comprising determining the charge state associated with the battery pack has reached a first steady state, wherein the one or more processors determines the charge state associated with the battery pack has reached the first steady state based on a timing-based criteria; and wherein the one or more processors estimates the first state of charge of the battery pack in response to determining the charge state associated with the battery pack has reached the first steady state.

15. The computer-implemented method of claim 12, further comprising determining the charge state associated with the battery pack has reached a first steady state, wherein the one or more processors determines the charge state associated with the battery pack has reached the first steady state based on a confidence bound; and wherein the one or more processors estimates the first state of charge of the battery pack in response to determining the charge state associated with the battery pack has reached the first steady state.

16. One or more non-transitory computer-readable media comprising instructions executable at one or more processors of an electric vehicle, wherein the instructions comprise a battery capacity determination procedure, and wherein the battery capacity determination procedure, when executed by the one or more processors, causes the one or more processors to:

determine a current state of charge of a battery pack before initiating battery discharging and battery charging;

initiate the battery discharging, wherein the battery discharging discharges a battery pack until a charge state associated with the battery pack reaches a first threshold level of charge;

estimate a first state of charge of the battery pack based on the charge state associated with the battery pack reaching the first threshold level of charge;

initiate the battery charging, wherein the battery charging charges the battery pack until the charge state associated with the battery pack reaches a second threshold level of charge;

estimate a second state of charge of the battery pack based on the charge state associated with the battery pack reaching the second threshold level of charge; and calculate a capacity of the battery pack based at least on the first state of charge and the second state of charge, wherein the battery capacity determination procedure initiates the battery charging before initiating the battery discharging based on the current state of charge of the battery pack.

17. The one or more non-transitory computer-readable media of claim 16, wherein the instructions further cause the one or more processors to determine the charge state associated with the battery pack has reached a first steady state, and wherein the one or more processors estimates the first state of charge of the battery pack in response to determining the charge state associated with the battery pack has reached the first steady state.

18. The one or more non-transitory computer-readable media of claim 16, wherein the instructions further cause the one or more processors to perform, based at least on the capacity of the battery pack, operations including one of:

adjusting one or more parameters of a battery management system (BMS) of the electric vehicle;

generating a repair alert associated with the battery pack; or generating a warranty certificate associated with the battery pack.

19. The one or more non-transitory computer-readable media of claim 16, wherein the first threshold level of charge corresponds to a minimum state of charge of the battery pack and the second threshold level of charge corresponds to a maximum state of charge of the battery pack.

\* \* \* \* \*